Patented June 11, 1935

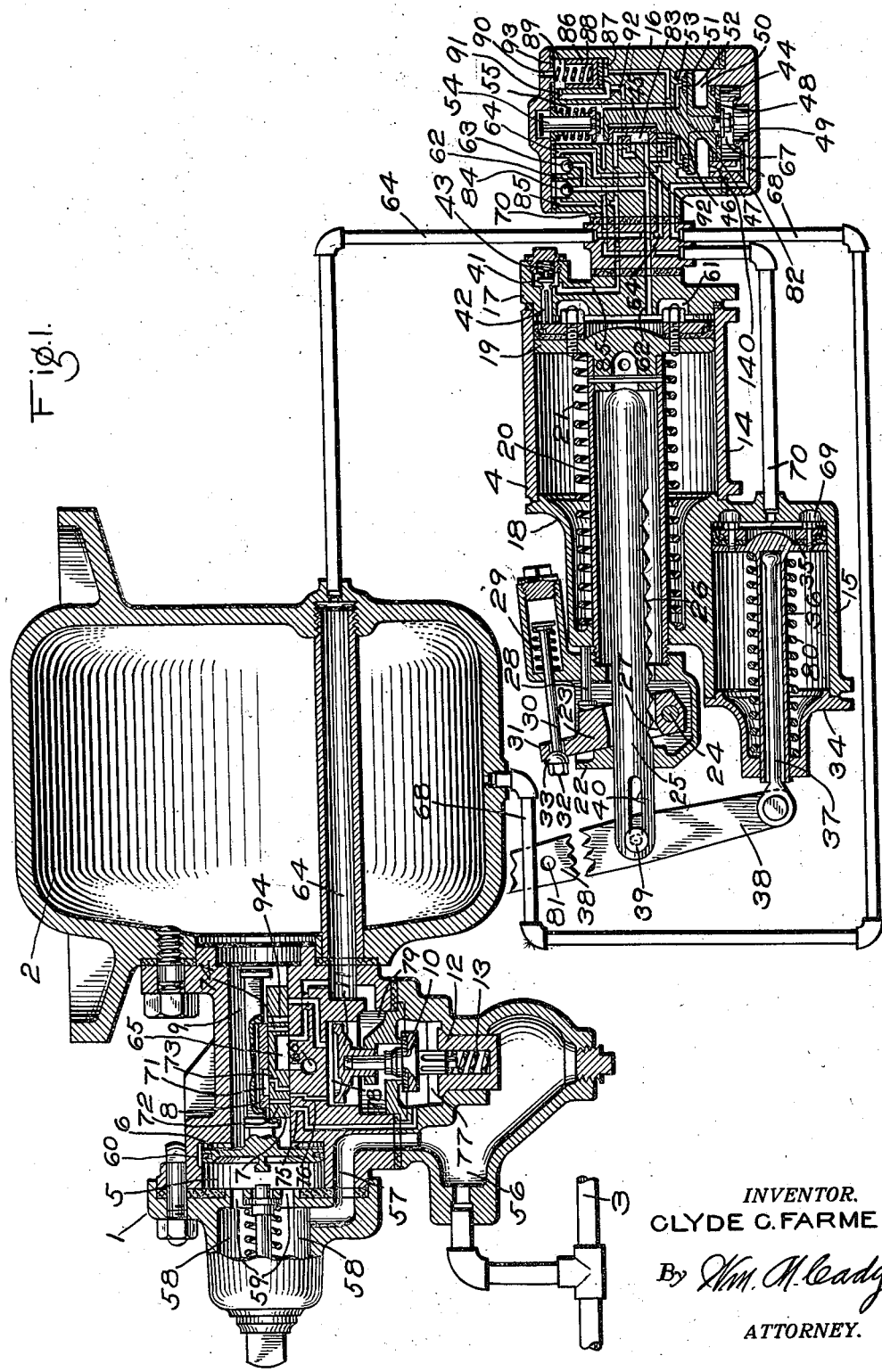

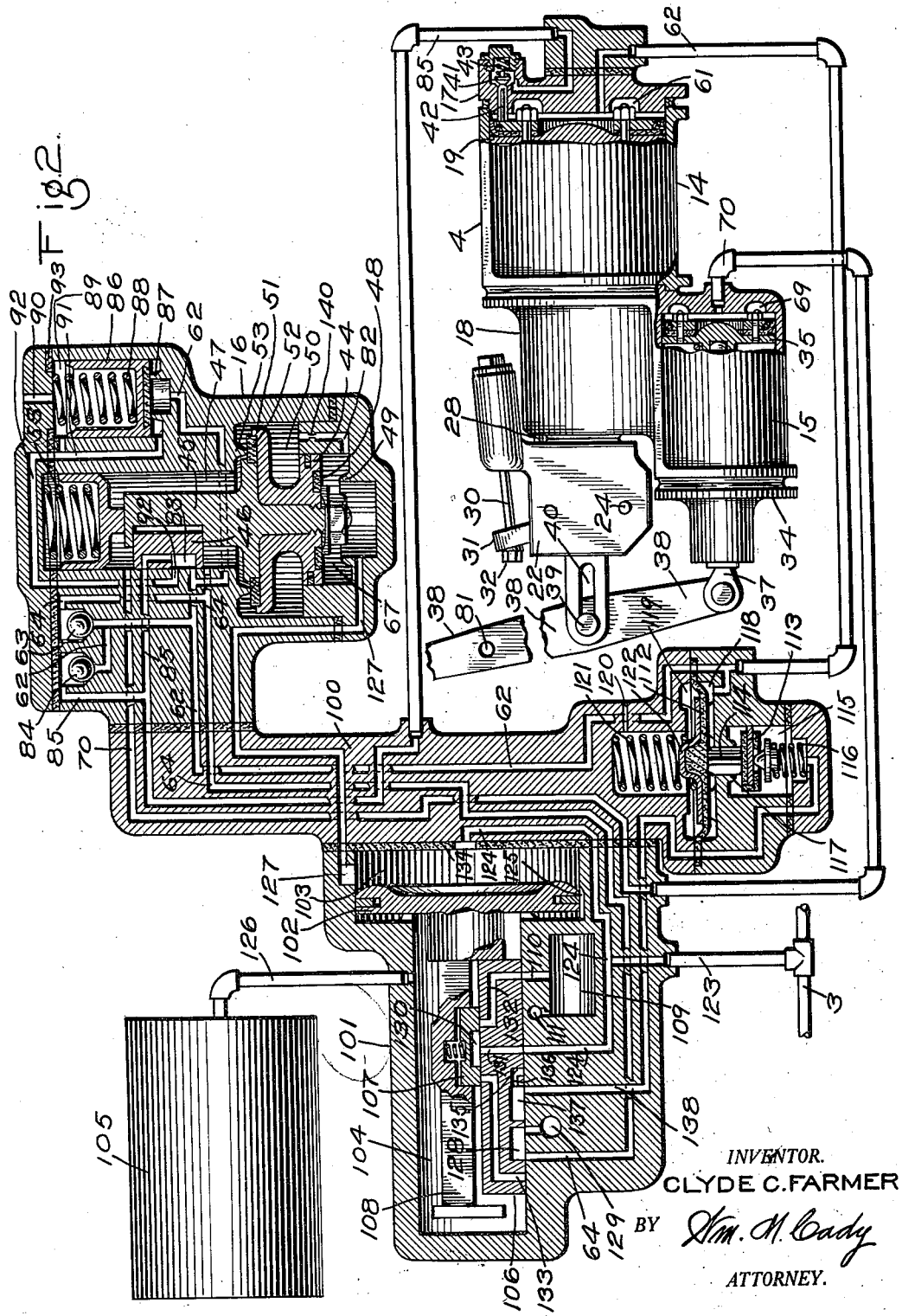

2,004,654

UNITED STATES PATENT OFFICE 2,004,654

FLUID PRESSURE BRAKE

Clyde C. Farmer, Pittsburgh, Pa., assignor to The Westinghouse Air Brake Company, Wilmerding, Pa., a corporation of Pennsylvania Application March 4, 1932, Serial No. 596,754

22 Claims. (Cl. 303—6)

This invention relates to fluid pressure brakes, and more particularly to the type adapted to operate upon a reduction in brake pipe pressure to effect an application of the brakes and upon an increase in brake pipe pressure to effect a release of the brakes.

In order to obtain adequate braking force on a heavy weight car, it is necessary to employ a brake cylinder piston having a greater area than the brake cylinder piston employed on a light weight car, for example, a brake cylinder piston having a diameter of 12" may be employed on a heavy weight car as compared with a brake cylinder piston having a diameter of 8" on a light weight car.

The usual fluid pressure brake equipment is so designed that for every pound reduction in brake pipe pressure, a predetermined increase in brake cylinder pressure is obtained by the usual supply of fluid under pressure from the auxiliary reservoir, or in other words, upon a reduction in brake pipe pressure, fluid is supplied from the auxiliary reservoir to the brake cylinder until the auxiliary reservoir pressure is reduced to a degree substantially equal to the reduced brake pipe pressure, and the brake cylinder pressure thus obtained bears a fixed relation to the degree of brake pipe reduction.

In order to maintain the desired or fixed ratio between brake pipe reduction and brake cylinder pressure obtained per pound reduction in brake pipe pressure, it has heretofore been necessary to provide an auxiliary reservoir having a capacity or volume corresponding with the area of the brake cylinder piston, for example, a 12" brake cylinder has heretofore required a greater capacity auxiliary reservoir than is required for an 8" brake cylinder piston.

Fluid under pressure for charging the auxiliary reservoirs on a train and for controlling the operation of the brake controlling valve devices is transmitted from the locomotive through the brake pipe, and the amount of fluid that has to be transmitted depends upon the volume or capacity of the auxiliary reservoir on the cars in the train, as well as the number of auxiliary reservoirs in the train as governed by the number of cars in the train. It will thus be evident that the time required for charging a train depends upon the capacity of the auxiliary reservoir on each car in the train and the number of cars in the train.

If the volume of the auxiliary reservoir be increased, as for heavy cars, or if the number of auxiliary reservoirs in a train be increased due to the present tendency to increase the length of trains, a longer time will be required to charge a train than has heretofore been required to charge shorter trains composed of lighter cars using smaller capacity auxiliary reservoirs. It is undesirable to thus increase the time required for charging a train, in that it increases the time between a release of the brakes and the recharging of the train preparatory to effecting a subsequent application of the brakes. Particularly in cycling operation on a descending grade where retaining valves are used to hold a certain pressure in the brake cylinders while the train is being recharged, it is especially desirable to be able to recharge the brake equipment in as short a time as possible, so as to be able to effect an application of the brakes before possible leakage of fluid under pressure from the brake cylinders on the train can reduce the braking power on the train sufficiently to permit the train to accelerate to a degree beyond control.

One object of my invention is to obviate the above conditions by providing an improved fluid pressure brake equipment having means whereby a larger brake cylinder may be used with an auxiliary reservoir of the volume heretofore proportioned for a smaller brake cylinder, without changing the ratio between the brake pipe reduction and brake cylinder pressure obtained per pound reduction in brake pipe pressure.

Another object of my invention is to provide an improved brake cylinder arrangement which may be associated with the usual triple valve device and auxiliary reservoir at present employed in freight service and which will produce a greater braking force than it is possible to obtain with the brake cylinder for which the auxiliary reservoir was originally intended, thereby obtaining greater braking power without any increase in the amount of fluid under pressure required for operation.

A more specific object of my invention is to provide a main brake cylinder for effectively applying the brakes, and a small slack take-up cylinder for moving the brake shoes into engagement with the car wheels before the main brake cylinder is operated, means being provided for permitting a limited free movement of the main brake cylinder piston before becoming effective, the amount of said free movement being calculated in accordance with the diameter of the main brake cylinder piston and the volume of the auxiliary reservoir, so as to maintain the predetermined relation, hereinbefore described, between the pressure obtained in the brake cylinder per pound reduction in brake pipe pressure.

Another object of my invention is to provide a brake equipment having a slack take-up cylinder and a main brake cylinder and improved valve means for controlling the supply of fluid first to the take-up cylinder and then to the main brake cylinder.

Other objects and advantages will appear in the following, more detailed description of my invention.

In the accompanying drawings, Fig. 1 is a diagrammatic view, mainly in section, of a fluid pressure brake equipment comprising the usual triple valve device and an auxiliary reservoir and having my improvements associated therewith; and Fig. 2 is a diagrammatic view, mainly in section, of another type of fluid pressure brake equipment embodying my invention.

As shown in Fig. 1, the fluid pressure brake equipment comprises a triple valve device 1 secured to one end of an auxiliary reservoir 2 and operative in accordance with variations in pressure in a brake pipe 3 for controlling the supply and release of fluid under pressure to and from a brake applying and releasing mechanism 4.

The triple valve device 1 comprises a casing secured to the auxiliary reservoir 2 and having a piston chamber 5 connected to the brake pipe 3 and containing a piston 6 adapted to operate a main slide valve 7 and an auxiliary slide valve 8 contained in a chamber 9 which is open to the auxiliary reservoir 2. The triple valve device is provided with the usual quick action mechanism comprising a fluid pressure vent valve 10, a piston 11 for actuating said vent valve, a check valve 12 and a spring 13 interposed between the vent valve 10 and check valve 12 for seating said vent valve.

The brake applying and releasing mechanism 4 comprises a main brake cylinder 14, a slack take-up cylinder 15, and a control valve device 16.

The brake cylinder 14 comprises the usual hollow cylinder, one end of which is closed by a pressure head 17, while the other end is closed by a non-pressure head 18. Contained in the cylinder is the usual movable piston 19 for applying the brakes. The piston 19 is provided with the usual hollow piston rod 20 slidably extending through a suitable bore in the outer end of the non-pressure head 18. A spring 21 is interposed between the piston 19 and non-pressure head 18 for moving the piston 19 to release position in effecting a release of the brakes.

Secured to the end of the piston rod 20 by means of screw-threaded engagement is a clutch or latch device 22 comprising a casing having a chamber containing a piston rod pawl or lock 23 pivotally mounted on a pin 24.

The casing of the latch device 22 and the lock 23 are provided with substantially aligned apertures through which a brake cylinder piston push rod 25 slidably extends. The push rod 25 is provided on one side with a plurality of teeth 26 with which the wedge-shaped sidewall 27 of the aperture through the lock 23 is adapted to coact upon clockwise rotation of said lock for effecting locking engagement between said push rod and lock.

The lock 23 is normally maintained released from the push rod 25 by means of a release pin 28 one end of which engages said lock, while the other end slidably extends through a suitable bore in the casing of the latch device and engages the end of the non-pressure head 18.

The casing of the latch device 22 is provided with a chamber containing a lock operating spring 29 and a pull rod 30 subject to the compressive force of said spring. The pull rod 30 slidably extends through a suitable bore in the casing of the latch device 22 and loosely through a bore in a projection 31 of the lock 23. The outer end of the pull rod 30 is provided with a nut 32 between which and the projection 31 is interposed a semicircular member 33 for permitting relative or rocking movement between the rod 30 and lock 23.

Preferably associated with the non-pressure head 18 is the slack take-up cylinder 15, having a removable non-pressure head 34 and containing a piston 35 provided with a hollow piston rod 36 slidably extending through a suitable bore in the non-pressure head 34. A spring 80 is interposed between the non-pressure head 34 and piston 35 for moving said piston to the release position shown in the drawing. Disposed in the piston rod 36 is a piston push rod 37, the outer end of which is secured to one end of a brake lever 38, which is provided with a fulcrum 81 about which said lever is adapted to be rotated in a clockwise direction to take up the slack in the brake rigging and place the brake shoes in braking engagement with the car wheels in the usual well known manner. The brake cylinder push rod 25 is connected to the lever 38 by means of a pin 39. The pin 39 extends through a slot 40 formed in push rod 25, so that said push rod may move to the left relative to lever 38 in effecting an application of the brakes, as will hereinafter be described more in detail.

Disposed in the brake cylinder pressure head 17 is a release valve 41 having a fluted stem 42 extending into the brake cylinder and adapted to be engaged by the brake cylinder piston 19 for unseating said valve. A spring 43 is provided for urging said valve into engagement with its seat.

The control valve device 16 is preferably mounted on the pressure head 17. Said device comprises a piston 44 having a stem 45 adapted to operate a slide valve 46 contained in a valve chamber 47. The piston 44 is provided on one side with a gasket 48 adapted at one time to effect a leakproof seal with a seat rib 49, said piston having at the opposite side a chamber 50 containing a valve member 51 carried by and movable with the stem 45. The valve member 51 is provided with a gasket 52 adapted normally to effect a leakproof seal with a seat rib 53. Disposed in the outer end of valve chamber 47 is a pressure exerting means for opposing upward movement of piston 44, said means comprising a plunger 54 and a spring 55 adapted to urge said plunger into engagement with the piston stem 45.

In operation, to initially charge the brake equipment with fluid under pressure, fluid under pressure is supplied to the brake pipe 3 in the usual manner and flows from thence through chamber 56 in the triple valve device 1, passage 57, chamber 58 and a plurality of ports 59 to the triple valve piston chamber 5.

Assuming the parts of the triple valve device 1 to be in release position, as shown in the drawings, fluid under pressure flows from chamber 5 through a feed groove 60 to valve chamber 9 and from thence to the auxiliary reservoir 2, thereby charging said reservoir to brake pipe pressure.

With the triple valve parts in release position, pressure chamber 61 at the right hand side of the brake cylinder piston 19 is vented to the atmosphere through passage 62, past a release check valve 63, through passage and pipe 64, cavity 65 in the triple valve slide valve 7 and atmospheric passage 66.

The parts of the control valve device 16 are normally maintained in the position shown in Fig. 1 by auxiliary reservoir pressure acting in chamber 50 on the valve member 51, said chamber being supplied with fluid from the auxiliary reservoir by way of pipe and passage 68, piston chamber 67 and passage 82 containing a choke 140.

With the control valve device in the normal position, pressure chamber 69 at one side of the slack take-up piston 35 is vented to the atmosphere by way of pipe and passage 70, valve chamber 47 of the control valve device and through passage and pipe 64 leading to the triple valve device 1.

If it is desired to effect a service application of the brakes, a gradual reduction in brake pipe pressure is effected in the usual manner. The pressure in piston chamber 5 of the triple valve device reduces with the reduction in brake pipe pressure, thereby permitting auxiliary reservoir pressure in valve chamber 9 to shift the piston 6 outwardly toward service application position.

The initial outward movement of the triple valve piston 6 moves the auxiliary slide valve 8 relative to the main slide valve 7 until a quick service cavity 71 connects ports 72 and 73 in the main slide valve 7 and until the usual service port 74 in the main slide valve is opened to the valve chamber 9. Further movement of the triple valve piston 6 then shifts the main slide valve 7 outwardly along with the auxiliary slide valve 8, until the main slide valve reaches quick service position in which ports 72 and 73 register with passages 75 and 76 respectively.

Passage 75 communicates with the vent valve chamber 77, while passage 76 leads to chamber 78 at the upper side of the quick action piston 11. Chamber 78 is connected past the loosely fitting quick action piston 11 to a chamber 79 which is open to the brake cylinder passage 64.

The brake cylinder passage 64 being normally at atmospheric pressure, fluid is vented from the vent valve chamber 77 to said passage upon movement of the triple valve device to quick service position, and from passage 64 flows through pipe and passage 64 in the control valve device 16 to valve chamber 47 and from thence through passage and pipe 70 to chamber 69 in the slack take-up cylinder 15.

The venting of fluid from vent valve chamber 77 to the take-up cylinder piston chamber 69 permits brake pipe pressure in chamber 56 of the triple valve device to unseat check valve 12 and flow to chamber 77 and from thence to the take-up piston chamber 69, thereby effecting a local quick service reduction in brake pipe pressure for serially propagating service operation of the triple valve devices 1 throughout the length of the train in the usual manner.

At the same time as a quick service reduction in brake pipe pressure is being effected as above described, fluid is permitted to flow from the auxiliary reservoir 2 through the service port 74 in the main slide valve 7 of the triple valve device to passage 64 and from thence to the take-up cylinder 15 along with fluid vented from the brake pipe 3 in effecting the quick service operation.

The pressure of fluid thus supplied through valve chamber 47 of the control valve device to piston chamber 69 of the take-up cylinder 15, moves the slack take-up piston 35 outwardly against the opposing pressure of the release spring 80. This outward movement of piston 35 actuates the push rod 37 to turn the brake applying lever 38 in a clockwise direction about the fulcrum 81, so as to take up the looseness or slack in the brake rigging and move the usual brake shoes into contact with the usual car wheels.

Since pin 39 in the brake lever 38 connects the brake cylinder push rod 25 to said lever, said push rod is pulled outwardly of the hollow piston rod 20 upon rotation of lever 38 by movement of the take-up cylinder piston 35.

The pressure required on the brake lever 38 for taking up the slack in the brake rigging and moving the brake shoes into engagement with the car wheels need not be great relative to the pressure required on said lever for effectively applying the brakes. As a result, the size of the take-up piston 35 may be small, as for instance, a piston 4" in diameter, and for operating said piston in the desired manner, a fluid pressure of for instance fifty pounds may be employed in chamber 69, this pressure also acting in valve chamber 47 on the valve member 51 within the seat rib 53 of the control valve device 16.

The area of the valve member 51 within seat rib 53 is thus subject to the pressure of fluid in the take-up cylinder, while on the other side said valve member is subject to auxiliary reservoir pressure as supplied from passage 68 through piston chamber 67 and passage 82 containing the choke 140.

The pressure of spring 55 acting on the piston stem 45 of the control valve device is such that, when a predetermined pressure, such as that above mentioned, is obtained in the take-up cylinder, the combined pressures of the spring and pressure of fluid supplied to the valve chamber 47 will slightly exceed the opposing auxiliary reservoir pressure in chamber 50, and the valve member 51 will then be moved from engagement with seat rib 53, which permits the pressure in chamber 50 to substantially equalize with the take-up cylinder pressure in valve chamber 47, after which the take-up cylinder pressure acts on one side of piston 44, which is subject on the other side to auxiliary reservoir pressure in chamber 67. The area of piston 44 is less than the area defined by the seat rib 53 on the valve member 51, so that it will be seen that the pressure opposing movement of the parts toward the seat rib 49 is less after the valve member moves from engagement with the seat rib 53. As a consequence, the spring 55 is permitted to promptly and positively move the parts to the opposite position, in which the piston 44 engages and seats on the seat rib 49. With the piston 44 engaging seat rib 49, the area subject to auxiliary reservoir pressure is reduced to that within said seat rib, while the area outside of said seat rib is subject to the take-up cylinder pressure in chamber 50 due to the equalization of pressures through the passage 82. As a result, the pressure opposing the pressure of spring 55 and take-up cylinder pressure acting in chamber 50 is further reduced so as to positively ensure the parts remaining in their lower position.

With the parts of the control valve device in the lower position, passage 64 is connected through a cavity 83 in the slide valve 46 to passage 62 leading to the brake cylinder piston chamber 61, thereby permitting fluid supplied by the triple valve to passage 64 to flow to said chamber and act on piston 19, causing said piston to move outwardly.

As hereinbefore described, the rotation of the brake lever 38 to take up the slack in the brake rigging, pulled the push rod 25 outwardly of the hollow piston rod 20, so that the initial movement of the brake cylinder piston 19 is relative to said push rod.

The outward movement of the brake cylinder piston 19 moves the latch device 22 away from the end of the non-pressure head, and as the pressure is thus relieved on the lock release pin 28, spring 29 rotates the lock 23 in a clockwise direction about the fulcrum 24, thereby turning the wedge-shaped surface 27 in the lock into locking engagement with the teeth 26 on the push rod 25, according to the position of the push rod in relation to said lock.

After the push rod 25 is thus locked, further movement of the piston 19 moves said rod outwardly relative to the brake lever 38, as permitted by the slot 40 in said rod. Such relative movement is, however, limited by engagement of the right hand end of slot 40 with pin 39 in the brake lever, after which the pressure acting in chamber 61 on the brake cylinder piston 19 merely applies pressure to the brake lever 38 for pushing the brake shoes against the car wheels in accordance with the pressure acting in piston chamber 61.

The maximum pressure obtainable in the brake cylinder piston chamber 61 is that produced by the equalization of the pressure in the auxiliary reservoir 2 into said chamber and into the take-up piston chamber 69, upon effecting a full service reduction in brake pipe pressure. If less than a full service reduction in brake pipe pressure is effected, then when the auxiliary reservoir pressure acting in valve chamber 9 becomes reduced, due to flow to the brake cylinder piston chamber 61, to a pressure slightly below the brake pipe pressure acting in the triple valve piston chamber 5, the piston 6 is actuated to move the auxiliary slide valve 8 to lap position in which the service port 74 is lapped so as to prevent further flow of fluid to the brake cylinder piston chamber 61.

As hereinbefore described, the pressure obtained in the take-up piston chamber 69 may be around fifty pounds, assuming that a normal brake pipe pressure of seventy pounds is carried. This fifty pounds pressure is substantially the same as obtained if a maximum service application of the brakes is effected, and therefore higher than obtained in the brake cylinder piston chamber 61 if the degree of application is less than a full service application. The take-up piston chamber 61 is at all times in communication with the control valve chamber 47 and when the control valve parts are moved to their lower position, the supply of fluid to said chamber from passage 64 is cut off, and as a result, the pressure in chamber 47 and in the take-up cylinder 15 is bottled up. If however, the pressure in valve chamber 47 should leak down below the pressure obtained in the brake cylinder piston chamber 61, fluid is permitted to flow to chamber 47 from passage 64 by way of the check valve 84 and through a passage 85, which is open to valve chamber 47 when the control valve parts are in their lower position. By thus ensuring the maintenance of pressure in chamber 47, the slide valve 45 is maintained seated against the pressure in passages 62 and 64 acting on the seating face of said slide valve.

The check valve 84 is provided in order to prevent back flow of fluid under pressure from the take-up piston chamber 69 to the brake cylinder piston chamber 61 when the control valve parts are moved to their lower position, thereby ensuring the slack in the brake rigging being maintained taken up by the piston 35.

The release valve 41, the function of which will hereinafter be described, seats immediately upon movement of the brake cylinder piston 19 to apply the brakes and thus also acts in the same capacity as check valve 84 when an application of the brakes is effected.

A vent valve piston 86 is provided in the control valve device 16 and is normally pressed into engagement with a seat rib 87 by means of a spring 88 contained in a chamber 89 which is open to the atmosphere through a passage 90. The seated area of said valve piston outside of said seat rib is open to the atmospheric passage 70 through a passage 91 when the vent valve piston is in its lower position, and said area is also in communication through passage 92 with the seat of the control slide valve 46. Before the control slide valve 46 is moved to its lower position, the brake cylinder piston chamber 61 is connected to the atmosphere through passage 62, cavity 83 in said slide valve, passages 92 and 91 and the atmospheric passage 90, so as to prevent operation of the brake cylinder piston 19 before intended, due to possible leakage from valve chamber 47 to the brake cylinder piston chamber 61. However, as soon as the control valve parts are moved to their lower position, the passage 92 is lapped, and fluid supplied to the brake cylinder through passage 62 flows also to the seated area of the vent valve piston 86 within the seat rib 87 and promptly moves said valve piston upwardly, against the opposing pressure of spring 88, and into sealing engagement with a gasket 93 so as to prevent loss of fluid which might possibly leak into passage 92.

It will at this time be noted that in effecting an application of the brakes the brake cylinder piston 19 freely moves relative to lever 38 a distance governed by the length of slot 40 in the push rod 25, and the resultant displacement of said piston plus the displacement of the slack take-up piston 35 bears such a relation to the volume of the auxiliary reservoir 2 as to provide the required ratio between brake pipe reduction and brake cylinder pressure obtained per pound of brake pipe reduction. It will be evident that the length of the slot 40 may be changed according to the diameter of piston 19, so as to maintain the displacement of said piston the same for different diameters of pistons, and as a result, the same capacity auxiliary reservoir 2 can be employed for different diameters of brake cylinders merely by changing the length of the slot 40 and thereby governing the free movement of the brake cylinder piston 19. It will further be noted that since the slack in the brake rigging is taken up by a piston of a small diameter, the main piston only has to operate to apply effective braking force, and the combined displacements of the slack take-up piston and main piston is less than if the main piston had to initially act to take up the slack before applying the brakes. As a result, a smaller auxiliary reservoir may be employed with the brake equipment shown in the drawings than would be necessary for the same size of main brake cylinder which had to initially operate to take up the slack.

As hereinbefore described, fluid is vented from the brake pipe to the take-up cylinder for effecting a quick service reduction in brake pipe pressure. This venting continues until the pressure in the vent valve chamber 77, which pressure builds up substantially with take-up cylinder pressure, plus the pressure of spring 13 is able to seat the check valve 12. Then when the control valve device 16 is moved to the lower position, the take-up cylinder is isolated and the brake cylinder 14 is connected to passage 64. At the time the brake cylinder 14 is connected to the fluid pressure supply passage 64, the brake cylinder piston chamber 61 is at atmospheric pressure, so that there will be a sudden reduction in pressure in passage 64 and consequently in the vent valve chamber 77 of the triple valve device. As a result, the check valve 12 is again unseated by brake pipe pressure in chamber 56 and fluid from the brake pipe then flows to the brake cylinder piston chamber 61 until sufficient pressure is obtained therein for seating the check valve 12 in the triple valve device.

It will thus be noted that quick service venting from the brake pipe occurs first to the take-up cylinder 15 and then upon operation of the control valve device 16 further quick service venting occurs from the brake pipe to the brake cylinder 14, the advantage obtained in the venting of fluid from the brake pipe to the brake cylinder 14 being merely to aid in reducing the brake pipe pressure and to provide some effective pressure in the brake cylinder, i. e., no particular benefit is obtained from the quick service venting to the brake cylinder 14 in so far as propagating serially the quick service operation of the triple valve devices in the train is concerned.

In order to effect a release of the brakes after an application, the brake pipe pressure is increased in the usual manner, causing a corresponding increase in the triple valve piston chamber 5 which actuates the triple valve piston 6 to move the slide valves 7 and 8 to the release position shown in the drawings.

In release position of the triple valve device, the brake cylinder passage 64 is connected to the atmosphere through cavity 65 in the triple valve slide valve 7 and atmospheric passage 66, so that fluid under pressure is vented from the brake cylinder piston chamber 61 through passage 62, cavity 83 in the slide valve 46 and passage 64. At the same time, fluid is also vented from the brake cylinder through passage 62, past the check valve 63 and through passage 64, said check valve being provided to prevent reverse flow in effecting an application of the brakes, which reverse flow would undesirably permit fluid to be supplied to the brake cylinder 14 simultaneously with the supply to the take-up cylinder. When the pressure in the brake cylinder piston chamber 61 is thus reduced to below the pressure of the release spring 21, the piston 19 is moved inwardly by said spring. When the piston 19 is moved nearly to its release position, the lock release pin 28 engages the non-pressure head 18, so that further movement of the piston causes said pin to push the lock 23 out of locking engagement with the push rod 25.

During the release of fluid from the brake cylinder piston chamber 61, the take-up piston chamber 69 and control valve chamber 47 remain bottled up with the control valve device in the lower position. Now, the final movement of the brake cylinder piston 19 to release position unseats the release check valve 42, past which fluid is vented from valve chamber 47 and the take-up cylinder by way of passage 85 to piston chamber 61 and thence to the atmosphere by way of passages 62 and 64.

As the pressure of fluid is increased in the auxiliary reservoir, by reason of the triple valve device being in release position in which fluid is supplied from the brake pipe 3 through the feed groove 60 to the auxiliary reservoir, said pressure acting on the control valve piston 44 within the seat rib 49, tends to return the control valve parts to their upper or normal position, which does occur when the opposing take-up cylinder pressure acting in chamber 47 and consequently in chamber 50 on the piston 44, is reduced to a predetermined low degree. As the piston 44 is moved and breaks the seal with seat rib 49, the full area of said piston is suddenly exposed to auxiliary reservoir pressure, which promptly causes said piston to move the parts to their normal position in which the valve member 51 engages the seat rib 53. The pressures then equalize in chambers 67 and 50 through passage 82, and since the seated area of the valve member 51 is greater than the area of piston 44, the parts are held in their normal position by a force which exceeds the actuating force.

With the control valve slide valve 46 in its normal position, passages 62 and 64 are disconnected through the slide valve 46, and passage 62 is opened to chamber 47 so that further venting of fluid from the take-up cylinder and valve chamber 47 occurs directly through passage 64, and fluid at this time remaining in the brake cylinder chamber 61 is permitted to vent by way of check valve 63 and from thence through passage 64.

With the vent valve piston 86 seated in its upper position, the lower side is subject to the pressure of fluid supplied from the brake cylinder piston chamber 61 through passage 62. When the brake cylinder pressure in passage 62 is substantially completely vented, spring 88 moves the valve piston 86 into engagement with rib 87, thereby opening communication between passage 92 and the atmospheric passage 90.

With the control valve parts in their upper position, passage 92 is connected through cavity 83 to passage 85 which is open to piston chamber 61 past the unseated check valve 41, so that any fluid remaining in the brake cylinder piston chamber 61 may be vented.

When the pressure of fluid is reduced in the take-up cylinder piston chamber 69 to below the value of the release spring 80, said spring moves the piston 35 to release position, thereby relieving the slack take-up pressure on the brake lever 38, permitting said lever to return to its normal position.

If it is desired to effect an emergency application of the brakes, a sudden reduction in brake pipe pressure is effected which causes the triple valve device 1 to operate in the well known manner to vent fluid from the brake pipe 3 to the brake cylinder passage 64 and to supply fluid from the auxiliary reservoir 2 through the emergency port 94 to the brake cylinder passage 64. The brake applying and releasing mechanism 4 then operates in the same manner as in effecting a service application of the brakes, and in view of this, it is deemed unnecessary to further describe the emergency operation.

In Fig. 1, my improved brake applying and releasing mechanism 4 is associated with a brake equipment employing the usual type of triple valve device 1, in which the quick service operation, in effecting a service application of the brakes, consists of venting fluid under pressure directly from the brake pipe first to the slack take-up cylinder 15 and then to the brake cylinder 14, at substantially the same time as fluid under pressure is supplied from the auxiliary reservoir 2 to the slack take-up cylinder and brake cylinder.

In Fig. 2 of the drawings, my improved brake applying and releasing mechanism is associated with a fluid pressure brake equipment including a quick service function which is of a somewhat different character than that in the triple valve device shown in Fig. 1.

The fluid pressure brake equipment shown in Fig. 2 comprises a pipe bracket 100 upon which is mounted a triple valve device 101 and the control valve device 16 which, in Fig. 1, is shown mounted on the brake cylinder pressure head 17. The equipment further comprises the slack take-up cylinder 15 and brake cylinder 14, which, as well as the control valve device 16, are substantially the same in construction as those disclosed in Fig. 1.

As shown in Fig. 2 of the drawings, the triple valve device 101 comprises a casing containing a piston 102 having a chamber 103 at one side connected to the brake pipe 3 and having a valve chamber 104 at the opposite side. The chamber 104 is connected to an auxiliary reservoir 105 and contains a main slide valve 106 and an auxiliary slide valve 107 adapted to be operated by a stem 108 projecting from the piston 102. A quick service reservoir 109 is provided in the casing of the triple valve device, said reservoir being connected to the seat of the main slide valve 106 by means of a passage 110 and open directly to the atmosphere at all times through a restricted atmospheric passage 111.

A quick service modifying valve device is provided in the pipe bracket 100, said device comprising a flexible diaphragm 112, a poppet valve 113 and a fluted pin 114 slidably mounted in a suitable bore in the casing and operatively connecting said diaphragm and poppet valve. The poppet valve 113 is contained in a chamber 115 and a spring 116 is provided in said chamber for urging said poppet valve into engagement with a seat rib 117. The diaphragm 112 has at one side a chamber 118 open at all times to passage 62 which is connected to the brake cylinder piston chamber 61, and at the other side a chamber 119 open at all times to the atmosphere through a passage 120. A spring 121 is contained in chamber 119 and acts on a follower plate 122 carried by the diaphragm 112 for urging said diaphragm downwardly and maintaining the poppet valve 113 normally unseated.

In operation, fluid under pressure is supplied to the brake pipe 3 in the usual manner and flows from said brake pipe through pipe and passage 123, and passage 124 to the seat of the main slide valve 106 and to piston chamber 103.

Assuming the triple valve parts to initially be in the release position shown in the drawings, fluid under pressure flows from chamber 103 through a feed groove 125 to valve chamber 104 and from thence through pipe 126 to the auxiliary reservoir 105.

Fluid from the triple valve piston chamber 103 flows through passage 127 to piston chamber 67 of the control valve device 16 and maintains the parts of said device in their upper position against the opposing pressure of spring 55, due to the fact that the valve chamber 47 is vented to the atmosphere through passage 64, a cavity 128 in the triple valve slide valve 106 and an atmospheric passage 129. Since the take-up cylinder piston chamber 69 is connected through passage and pipe 70 to valve chamber 47 of the control valve device and since the brake cylinder piston chamber 61 is connected through pipe and passage 62 and past check valve 63 to passage 64, which is open to the atmosphere through the triple valve device, both of said piston chambers are vented.

If it is desired to effect a service application of the brakes, a gradual reduction in brake pipe pressure is initiated at the front end of the train, in the usual manner, and a corresponding reduction occurs in the piston chamber 103. The higher auxiliary reservoir pressure in valve chamber 104 then actuates the piston 102 to move the auxiliary slide valve 107 relative to the main slide valve 106 to the initial quick service position in which a cavity 130 in said slide valve connects ports 131 and 132 in the main slide valve 106 and at substantially the same time uncovers a service port 133.

With the main slide valve 106 in the release position, as shown in the drawings, port 131 registers with the brake pipe passage 124, while port 132 registers with the quick service reservoir passage 110, so that fluid under pressure is permitted to rapidly flow from the brake pipe 3 to the quick service reservoir 109 and thereby effect a quick service reduction in brake pipe pressure for causing the triple valve parts to be moved to service position in which the piston 102 engages a gasket 134, and for also causing quick service operation of the triple valve devices on the train to occur serially throughout the length of the train in the usual well known manner.

If the triple valve parts do not move upon the reduction in brake pipe pressure caused by the rapid venting to the quick service reservoir 109, the brake pipe pressure will continue to reduce at a rate governed by the atmospheric vent 111 from said reservoir, until a sufficient reduction in brake pipe pressure is obtained to cause the auxiliary reservoir pressure in valve chamber 104 to move the piston 102 and slide valves 106 and 107 to service position, in which position ports 131 and 132 are disconnected from passages 124 and 110, respectively, so as to prevent further venting of fluid from the brake pipe to the quick service reservoir 109.

In service position of the triple valve device, the service port 133 through the main slide valve 106 registers with passage 64, so that fluid under pressure is permitted to flow from the auxiliary reservoir 105 through port 133 and passage 64 to valve chamber 47 of the control valve device and from thence through passage 70 to the take-up-cylinder piston chamber 69, for operating the take-up cylinder piston 35 to take up the slack in the brake rigging.

In service position of the triple valve piston 102, passage 127 is connected to valve chamber 104 so that piston chamber 67 of the control valve device 16 is supplied with fluid at auxiliary reservoir pressure, and as a result, the control valve device is operated in accordance with the reduction in auxiliary reservoir pressure and consequent increase in take-up cylinder pressure in valve chamber 47 to control the supply of fluid under pressure to the brake cylinder piston chamber 61 in the same manner as hereinbefore described in connection with the construction shown in Fig. 1.

When the triple valve device moves to service position, the brake pipe passage 124 is connected to a cavity 135 in the main slide valve 106. Cavity 135 is connected through a restricted passage 136 to a cavity 137, which at this time is connected to a passage 138, so that fluid under pressure is permitted to flow from the brake pipe to passage 138 and from thence to valve chamber 115 of the quick service modifying valve device. The poppet valve 113 is normally unseated, so that fluid supplied from the brake pipe to chamber 115 flows past the valve 113 to chamber 118 and thence to passage 62. Passage 62 leads to the brake cylinder piston chamber 61 and while fluid under pressure is being supplied to the take-up cylinder piston chamber 69, passage 62 is vented through cavity 83 in the control valve slide valve 46, passages 92 and 91, vent valve chamber 89 and atmospheric passage 90.

The fluid vented from the brake pipe through the quick service modifying valve device to passage 62 is at a restricted rate as governed by the restricted passage 136 in the triple valve slide valve 106, one object of such venting being to smooth out surges in brake pipe pressure, which may have been created by the initial rapid quick service venting of fluid under pressure from the brake pipe to the quick service reservoir 109.

Fluid vented from the brake pipe to the brake cylinder passage 62 is vented to the atmosphere past the vent valve piston 86 until the control slide valve 46 is moved to its lower position in which fluid under pressure is supplied to the brake cylinder 14 for applying the brakes, the object of thus venting fluid from passage 62 to the atmosphere being to prevent the brake cylinder piston 19 from being moved before the slack take-up cylinder piston 35 has functioned to properly take up the slack in the brake rigging.

After the control valve device 16 operates to supply fluid to passage 62 and the brake cylinder 14, fluid continues to flow from the brake pipe, past the poppet valve 113 to passage 62 and from thence to the brake cylinder until the pressure in the brake cylinder acting in diaphragm chamber 118 of the quick service modifying valve device is built up to a pressure slightly exceeding the pressure of spring 121, at which time diaphragm 112 is deflected upwardly. This permits spring 116 to seat the poppet valve 113 and prevent further quick service venting of fluid from the brake pipe. By the use of the quick service modifying valve device, the degree of brake pipe reduction which may be effected by quick service action is limited and thus uniform throughout the train and as a result tends to produce a uniform application of brakes besides hastening the rate of application.

If less than a full service reduction in brake pipe pressure is effected, then when the auxiliary reservoir pressure in valve chamber 104 of the triple valve device is reduced to slightly below the brake pipe pressure acting in piston chamber 103, the triple valve piston 102 is moved inwardly to lap position. The auxiliary slide valve 107 is thus actuated to lap the service port 133 so as to prevent further flow of fluid from the auxiliary reservoir to the brake cylinder 14.

In lap position, passage 127 is opened to piston chamber 103 and thus fluid at brake pipe pressure is supplied to piston chamber 67 within the seat rib 49, when the piston 44 is engaging said seat rib. Now, if the take-up cylinder pressure acting in the control valve chamber 47 should, for any reason, become reduced sufficiently for brake pipe pressure to move the control valve piston 44 away from seat rib 49, leakage may occur from the brake pipe through chamber 67, passage 82 and restriction 140 to chamber 50 and from thence to chamber 47 and the take-up cylinder. Such leakage will tend to reduce brake pipe pressure and cause the triple valve device to operate to apply the brakes with greater force, which is more desirable than in case passage 67 is at all times connected to the triple valve chamber as shown in Fig. 1, in which latter case, leakage from the auxiliary reservoir would tend to reduce auxiliary reservoir pressure to below brake pipe pressure and thus cause the triple valve parts to be moved to release position and effect an undesired release of the brakes.

In order to effect a release of the brakes after an application, fluid under pressure is supplied to the brake pipe 3 and piston chamber 103 of the triple valve device in the usual manner. The triple valve piston 102 is thereupon actuated to move the slide valves 106 and 107 to release position.

In release position of the triple valve parts, fluid is supplied from the brake pipe through feed groove 125 to valve chamber 104 and the auxiliary reservoir 105 thereby charging said reservoir. At the same time, passage 64 is connected to the atmosphere through cavity 128 in the slide valve 106 and passage 129, so that fluid is vented from the brake cylinder 14 and take-up cylinder 15, and the control valve device 16 is moved to its upper position in the same manner as described in connection with the construction shown in Fig. 1. When the brake cylinder pressure acting in diaphragm chamber 118 of the quick service modifying valve device is reduced to below the pressure of spring 121, the diaphragm 112 is deflected downwardly by said spring so as to unseat poppet valve 113 for permitting the quick service modifying valve device to function upon the next application of brakes.

It will now be evident, that in accordance with my invention a slack take-up cylinder is provided for taking up the slack in the brake rigging, and a brake cylinder is provided for applying the brakes with force, improved valve means being provided for controlling the supply of fluid from the triple valve device or other brake controlling valve device to said cylinders. The brake cylinder push rod is provided with means whereby, after the slack in the brake rigging is taken up by operation of the take-up cylinder, the brake cylinder piston must move a predetermined distance before becoming effective, said predetermined distance depending upon the diameter of the brake cylinder piston so as to maintain a substantially predetermined, fixed ratio between the combined displacement of the slack take-up piston plus brake cylinder piston and the volume of the auxiliary reservoir. By these means, it is possible to employ a larger diameter brake cylinder with an auxiliary reservoir of a volume such as is required for a smaller brake cylinder having the dual function of taking up slack and then applying the brakes with force.

In order to provide simplicity in the embodiment of the predetermined brake cylinder piston travel feature, I have mounted the slack take-up cylinder directly on the non-pressure head of the brake cylinder, so that the push rod of both cylinders may be arranged in parallel and connected to the same brake applying lever. According to this arrangement, the brake lever is provided with an extension from the point of engagement of the brake cylinder push rod to the point of engagement of the slack take-up rod which increases the leverage of the slack take-up cylinder piston and consequently permits the use of a smaller slack take-up cylinder than if said piston were connected to the brake lever at a point closer to the fulcrum.

In Fig. 1, the improved brake applying and releasing mechanism is associated with the usual type of triple valve device which is operative to vent fluid from the brake pipe to a passage leading to the take-up cylinder and brake cylinder for effecting a quick service reduction in brake pipe pressure in applying the brakes. This mechanism is also adapted to be associated with a triple valve device having the type of quick service shown in Fig. 2, in which type a local, rapid but limited quick service reduction in brake pipe pressure is effected, such quick service being followed by the simmering of fluid under pressure from the brake pipe to the brake cylinder.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a brake lever, of means for applying braking force to said lever and movable a predetermined distance relative to said lever before becoming effective, a brake cylinder piston adapted to be locked to said means for operating said means, and another piston adapted to operate said lever to take up the slack in the brake rigging before the operation of the brake cylinder piston.

2. The combination with a brake lever, of means for applying braking force to said lever, said means comprising a push rod carried by said lever and movable a predetermined distance relative to said lever before becoming effective, a brake cylinder piston for moving said push rod, and a slack take-up piston for operating said lever to take up the slack in the brake rigging before the operation of the brake cylinder piston.

3. The combination with a brake lever, of a cylinder and piston for operating said lever to take up the slack in the brake rigging, a push rod carried by said lever for applying braking force to said lever, said push rod being movable a predetermined distance relative to said lever before becoming effective, a brake cylinder, and a piston in said brake cylinder for moving said push rod.

4. The combination with a brake lever, of a cylinder and piston for operating said lever to take up the slack in the brake rigging, a brake cylinder and piston for applying braking force to said lever, means for transmitting the pressure of the brake cylinder piston to said lever and movable a predetermined distance relative to said lever before becoming effective, and a clutch device operative upon the initial movement of the brake cylinder piston for locking said brake cylinder piston to said means.

5. The combination with a brake lever, of a brake cylinder push rod for operating said lever to apply the brakes, and movable relative to said lever a predetermined distance, a piston for operating said lever to take up the slack in the brake rigging, a brake cylinder piston for applying force to said push rod after the operation of said slack take-up piston, and a clutch device operative upon the initial movement of the brake cylinder piston for locking the brake cylinder piston to said push rod.

6. In a fluid pressure brake, the combination with a brake pipe and an auxiliary reservoir, of a brake lever, a piston for operating said lever to take up the slack in the brake rigging, a brake cylinder piston for applying braking force to said lever, valve means operative upon a reduction in brake pipe pressure to supply fluid from said auxiliary reservoir to first operate the slack take-up piston and then the brake cylinder piston, and means for permitting the brake cylinder piston to freely move relative to said brake lever a distance dependent upon the area of the brake cylinder piston with respect to the volume of the auxiliary reservoir whereby the movement of the brake cylinder piston is adjusted, according to its area, to the volume of the auxiliary reservoir.

7. In a fluid pressure brake, the combination with a brake pipe and an auxiliary reservoir, of a piston operative to take up the slack in the brake rigging, a brake cylinder piston for applying the brakes with force and freely movable relative to said slack take-up piston a predetermined distance before becoming effective, valve means operative upon a reduction in brake pipe pressure to supply fluid from said auxiliary reservoir first to said slack take-up piston and then to said brake cylinder piston, and means for limiting the free movement of said brake cylinder piston in accordance with the diameter of said brake cylinder piston as related to the volume of said auxiliary reservoir.

8. In a fluid pressure brake, the combination with a brake pipe, an auxiliary reservoir and a brake lever, of a piston for operating said lever to take up the slack in the brake rigging, a push rod movable with said lever upon operation of said piston, a brake cylinder piston for applying braking force to said lever, a clutch device operative upon the initial movement of said brake cylinder piston for locking said brake cylinder piston to said push rod, valve means operated upon a reduction in brake pipe pressure for supplying fluid from the auxiliary reservoir first to the slack take-up piston and then to the brake cylinder piston, and means interposed between the brake cylinder piston and the brake lever for permitting free relative movement of the brake cylinder piston and push rod relative to said lever a distance governed by the relation between the area of the brake cylinder piston and the volume of the auxiliary reservoir.

9. In a fluid pressure brake, the combination with a brake pipe, an auxiliary reservoir, and a brake lever, of a piston for operating said lever to take up the slack in the brake rigging, a fulcrum pin in said lever, a push rod having a slot for receiving said pin and for permitting relative movement of said push rod to said lever, a movable brake cylinder piston for operating said push rod to apply braking force to said lever, a clutch device operative upon the initial movement of said brake cylinder piston for locking said push rod to said brake cylinder piston, and valve means operated upon a reduction in brake pipe pressure to supply fluid under pressure first to the slack take-up piston and then to the brake cylinder piston, the length of the slot in the push rod being governed by the relation between the area of the brake cylinder and the volume of the auxiliary reservoir.

10. In a fluid pressure brake, the combination with a brake cylinder and another cylinder mounted on said brake cylinder, of valve means carried by the brake cylinder and controlled by the pressure of fluid in said other cylinder for establishing communications through which fluid under pressure is supplied first to the other cylinder and then to the brake cylinder and through which fluid is vented from said cylinders in the reverse order.

11. In a fluid pressure brake, the combination with a brake cylinder and piston and another cylinder and piston, of valve means for normally connecting a passage, to which fluid under pressure is supplied for effecting an application of the brakes and from which fluid under pressure is vented to effect a release of the brakes, to a passage communicating with said other cylinder and operative upon a predetermined increase in pressure in said other cylinder to cut off the supply of fluid under pressure to said other cylinder and to connect the first mentioned passage to a passage communicating with said brake cylinder, and a valve controlled by said brake cylinder piston for connecting said other cylinder to the brake cylinder.

12. In a fluid pressure brake, the combination with a brake cylinder and piston and another cylinder and piston, of valve means for normally establishing a communication through which fluid is adapted to be supplied to said other cylinder and operative upon a predetermined increase in pressure in said other cylinder for closing said communication and for establishing another communication through which fluid is adapted to be supplied to the brake cylinder for moving the brake cylinder piston to application position and through which fluid is adapted to be vented from the brake cylinder for permitting the brake cylinder piston to move to release position, and valve means operated by said brake cylinder piston in moving to release position for establishing a communication through which fluid is vented from said other cylinder to said brake cylinder.

13. In a fluid pressure brake, the combination with a brake cylinder and piston and another cylinder and piston, of valve means normally connecting a passage, to which fluid under pressure is supplied for effecting an application of the brakes and from which fluid under pressure is vented to effect a release of the brakes, to a passage communicating with said other cylinder and operative upon a predetermined increase in pressure in said other cylinder to cut off the supply of fluid under pressure to said other cylinder and to connect the first mentioned passage to a passage communicating with said brake cylinder, said valve means being also operative upon said predetermined increase in pressure in said other cylinder to open communication from the other cylinder to the brake cylinder, and a valve controlled by the brake cylinder piston for controlling said communication.

14. In a fluid pressure brake, the combination with a brake cylinder and piston and another cylinder and piston, of valve means for normally connecting a passage, to which fluid under pressure is supplied for effecting an application of the brakes and from which fluid is vented to effect a release of the brakes, to a passage communicating with said other cylinder and operative upon a predetermined increase in pressure in said other cylinder to cut off the supply of fluid to said other cylinder and to connect the first mentioned passage to a passage communicating with said brake cylinder and said first mentioned passage, a check valve for preventing flow of fluid from the first mentioned passage to the last mentioned passage, and a valve controlled by movement of the brake cylinder piston for controlling communication between said cylinders upon operation of said valve means.

15. In a fluid pressure brake, the combination with a brake cylinder and piston and another cylinder and piston, of valve means for normally connecting a passage, to which fluid under pressure is supplied for effecting an application of the brakes and from which fluid is vented to effect a release of the brakes, to a passage communicating with said other cylinder and operative upon a predetermined increase in pressure in said other cylinder to cut off the supply of fluid to said other cylinder and to connect the first mentioned passage to a passage communicating with said brake cylinder and to another passage through which communication is established from said brake cylinder to said other cylinder upon operation of said valve means, a check valve in the last mentioned communication for preventing flow of fluid from the other cylinder to the brake cylinder, and valve means operated upon movement of the brake cylinder piston to apply the brakes to close communication between the brake cylinder and the other cylinder and operated upon movement of the brake cylinder piston in releasing the brakes to open communication from the other cylinder to the brake cylinder.

16. In a fluid pressure brake, the combination with a brake pipe, an auxiliary reservoir, a brake cylinder, and another cylinder, of a triple valve device operative upon a reduction in brake pipe pressure to supply fluid from said auxiliary reservoir to a passage and operated upon an increase in brake pipe pressure to vent fluid under pressure from said passage, valve means subject to the opposing pressures of the other cylinder and fluid at brake pipe pressure and having a normal position for connecting said passage to the other cylinder and operative upon a predetermined increase in pressure in said other cylinder and a predetermined reduction in the opposing pressure to cut off the supply of fluid under pressure to said other cylinder and to supply fluid under pressure to said brake cylinder, means for venting fluid from the brake cylinder to the triple valve passage independently of said valve means, and a valve operated upon the release of fluid from said brake cylinder for venting fluid from said other cylinder to said brake cylinder.

17. In a fluid pressure brake, the combination with a brake pipe, an auxiliary reservoir, a brake cylinder, and another cylinder, of a triple valve device operative upon a reduction in brake pipe pressure to supply fluid from said auxiliary reservoir to a passage and operated upon an increase in brake pipe pressure to vent fluid under pressure from said passage, valve means subject to the opposing pressures of the other cylinder and fluid at brake pipe pressure and having a normal position for connecting said passage to the other cylinder and operative upon a predetermined increase in pressure in said other cylinder and a predetermined reduction in the opposing pressure to cut off the supply of fluid under pressure to said other cylinder and to supply fluid under pressure to said brake cylinder, means for venting fluid from the brake cylinder to the triple valve passage independently of said valve means, a valve operated upon the release of fluid from said brake cylinder for venting fluid from said other cylinder to said brake cylinder, said valve means being operative upon a predetermined reduction in pressure in said other cylinder and a predetermined increase in auxiliary reservoir pressure to vent fluid directly from said other cylinder to said triple valve passage and from said brake cylinder past said valve to a communication adapted to be opened to the atmosphere, and another valve for controlling said communication and operative upon a predetermined reduction in brake cylinder pressure for opening said communication.

18. In a fluid pressure brake, the combination with a brake pipe, a cylinder for taking up the slack in the brake rigging, a cylinder for applying the brakes with force, and valve means operated upon a reduction in brake pipe pressure to vent fluid under pressure from said brake pipe first to the slack take-up cylinder and then to said brake cylinder for effecting a quick service reduction in brake pipe pressure, said valve means being also operative at the same time to supply fluid under pressure first to said slack take-up cylinder and then to said brake cylinder for applying the brakes.

19. In a fluid pressure brake, the combination with a brake pipe, an auxiliary reservoir, a slack take-up cylinder and a brake cylinder, of a triple valve device operative upon a reduction in brake pipe pressure to vent fluid under pressure from said brake pipe to a passage normally communicating with said slack take-up cylinder for effecting a quick service reduction in brake pipe pressure, said triple valve device being also operative upon a reduction in brake pipe pressure to supply fluid under pressure from said auxiliary reservoir to said passage, and valve means operated by a predetermined increase in take-up cylinder pressure for connecting said passage to said brake cylinder for effecting a further quick service reduction in brake pipe pressure and for applying the brakes.

20. In a fluid pressure brake, the combination with a brake pipe, a source of fluid under pressure, a slack take-up cylinder and a brake cylinder, of a triple valve device operative upon a reduction in brake pipe pressure to vent fluid under pressure from said brake pipe to said brake cylinder for effecting a quick service reduction in brake pipe pressure and to supply fluid under pressure from said source to said take-up cylinder, and valve means controlled by the pressure in said take-up cylinder and normally establishing a communication through which said brake cylinder is vented to the atmosphere, and another communication through which fluid is supplied from said source to said brake cylinder by the operation of said triple valve device, said valve means being operated upon an increase in take-up cylinder pressure to close the first mentioned communication and open another communication through which fluid is supplied from said source to said brake cylinder by the operation of said triple valve device.

21. In a fluid pressure brake, the combination with a brake pipe, a source of fluid under pressure, a slack take-up cylinder and a brake cylinder, of a triple valve device operative upon a reduction in brake pipe pressure to vent fluid under pressure from said brake pipe to said brake cylinder for effecting a quick service reduction in brake pipe pressure and to supply fluid under pressure from said source to said take-up cylinder, valve means controlled by the pressure in said take-up cylinder and normally establishing a communication through which said brake cylinder is vented to the atmosphere, and another communication through which fluid is supplied from said source to said brake cylinder by the operation of said triple valve device, said valve means being operated upon an increase in take-up cylinder pressure to close the first mentioned communication and open another communication through which fluid is supplied from said source to said brake cylinder by the operation of said triple valve device, and a valve device operated upon a predetermined increase in brake cylinder pressure for closing the communication through which fluid is vented from the brake pipe to said brake cylinder.

22. The combination with a brake lever, of a take-up brake cylinder, a piston therein operatively connected to said lever, a member having a lost motion connection with said lever, a main brake cylinder, a piston therein, means operative upon initial movement of the main brake cylinder piston for operatively connecting said main piston with said member, and means for first supplying fluid under pressure to the take-up piston to operate said lever and then to said main piston to apply pressure through said member to said lever upon a movement of said main piston and member relative to said lever.

CLYDE C. FARMER.